(12) United States Patent
Tarnowsky et al.

(10) Patent No.: US 8,039,988 B2
(45) Date of Patent: Oct. 18, 2011

(54) SOLAR POWERED VENTILATION SYSTEM FOR VEHICLE AND METHOD OF OPERATING THE SAME

(75) Inventors: Steven A. Tarnowsky, West Bloomfield, MI (US); Gregory A. Major, Farmington Hills, MI (US); Stephen G. Poulos, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 449 days.

(21) Appl. No.: 12/248,070

(22) Filed: Oct. 9, 2008

(65) Prior Publication Data

US 2010/0090527 A1    Apr. 15, 2010

(51) Int. Cl.
*H02H 7/18* (2006.01)
(52) U.S. Cl. ..................................................... 307/10.7
(58) Field of Classification Search .................. 307/9.1, 307/10.7; 454/69, 75, 900; 62/3.3, 3.5, 3.61
See application file for complete search history.

(56) References Cited

U.S. PATENT DOCUMENTS

| | | | |
|---|---|---|---|
| 6,290,593 B1 * | 9/2001 | Weissbrich et al. | 454/75 |
| 2008/0302878 A1 | 12/2008 | Helms | |

FOREIGN PATENT DOCUMENTS

| | | |
|---|---|---|
| DE | 102004020428 A1 | 11/2005 |
| DE | 102005048833 A1 | 4/2007 |
| EP | 1591283 A1 | 11/2005 |

OTHER PUBLICATIONS

Bill Russ Mazada 929 Sedan New car Review.
Auto Cool Vent Solar Powered Fan As Seen On TV http://www.asseenontvguys.com/index.asp?PageAction=VIEWPROD&ProdID=172.

* cited by examiner

*Primary Examiner* — Jared J Fureman
*Assistant Examiner* — Carlos Amaya
(74) *Attorney, Agent, or Firm* — Quinn Law Group, PLLC

(57) ABSTRACT

A solar powered ventilation system for regulating the interior temperature of a motorized vehicle and a method of controlling the same is provided. The vehicle includes a battery pack in electrical communication with at least one motor assembly that is selectively operable to propel the vehicle. The solar powered ventilation system includes a solar panel in electrical communication with a fan and the battery pack. The method includes: determining if sufficient solar load is available; if so, determining the current vehicle power mode; determining if the current battery pack temperature is greater than a threshold battery pack temperature if the vehicle is in "off" or "accessories on" mode; and commanding the solar powered ventilation system to modify the interior temperature of the vehicle to thereby decrease the temperature of the battery pack if the current battery pack temperature is greater than the threshold battery pack temperature.

18 Claims, 3 Drawing Sheets

SOLAR POWERED VENTILATION SYSTEM FOR VEHICLE AND METHOD OF OPERATING THE SAME

TECHNICAL FIELD

The present invention relates generally to motorized vehicles, and more specifically to solar powered ventilation systems for vehicle interior compartments.

BACKGROUND OF THE INVENTION

Conventional automotive vehicles include a powertrain (sometimes referred to as "drivetrain") that is generally comprised of an engine in power flow communication with a final drive system (e.g., differential and wheels) via a multi-speed power transmission. Automobiles have traditionally been powered solely by a compression-ignited or spark-ignited internal combustion engine (ICE) because of its ready availability and relative cost. Hybrid type powertrains, on the other hand, generally employ one or more motor/generator units that operate individually or in concert with an internal combustion engine to propel the vehicle.

One premise behind hybrid-type vehicles is that alternative power is available to propel the vehicle, minimizing reliance on the engine for power, thereby increasing fuel economy. The hybrid powertrain takes advantage of both the ICE and motor/generator(s) to improve upon fuel economy and exhaust emissions. Since hybrid-type vehicles can derive their power from sources other than the engine, engines in hybrid-type vehicles typically operate at lower speeds more often than their traditional counterpart, and can be turned off while the vehicle is propelled by the alternative power source(s). Moreover, many hybrid vehicles use electrical regenerative braking to recharge an internal electrical power storage device.

Electric vehicles (EV) and hybrid electric vehicles (HEV) use battery packs, often comprised of several individual battery modules, to provide current to the motor/generators in order to propel the vehicle and operate vehicle accessories. It is well known that excessively hot temperatures may degrade overall battery performance and reduce battery operational life expectancy. For HEVs, hot temperatures can limit hybrid system performance, which can mean inconsistent operation and lower fuel economy. In addition, hybrid-electric vehicle batteries are generally larger and more complex than traditional Starting-Lighting-and-Ignition (SLI) batteries; thus, replacing HEV battery modules is costly.

When an automobile, hybrid or otherwise, is parked with the windows closed on a sunny day, the solar load can quickly heat both the passenger and trunk compartments well beyond the outside ambient temperature. On a typical 80 degrees Fahrenheit (° F.) sunny day, for example, inside vehicle temperatures can exceed 115° F. With a vehicle soaking in these conditions for a prolonged period of time, an operator that enters the vehicle may experience unbearably hot temperatures upon entering the vehicle. If full hybrid performance were then to be allowed, the batteries would heat even more under normal use, and reduced battery life would result. If hybrid battery usage was limited to protect battery life, hybrid performance would suffer.

SUMMARY OF THE INVENTION

According to one embodiment of the present invention, a method of controlling a solar powered ventilation system for a motorized vehicle is provided. The vehicle includes a battery pack in electrical communication with one or more motor assemblies each selectively operable to propel the vehicle. The method includes the steps of: determining if a predetermined minimum solar load is available; if so, determining if the current vehicle power mode is in "off" mode or "accessories on" mode; if the vehicle power mode is currently in off or accessories on mode, determining if the current battery pack temperature is greater than a threshold battery pack temperature; and commanding the solar powered ventilation system to modify the interior temperature of the vehicle to thereby decrease the temperature of the battery pack if the current battery pack temperature is greater than the threshold battery pack temperature.

According to one aspect of this particular embodiment, the method also includes determining if the ambient air temperature is less than the vehicle interior temperature if the current vehicle power mode is in off or accessories on mode. In this instance, commanding the solar powered ventilation system to modify the vehicle interior temperature in order to decrease the temperature of the battery pack includes disabling solar powered battery pack charging, setting the vehicle HVAC system to allow ambient air into the vehicle interior, and enabling the solar powered ventilation system vent fan if the ambient air temperature is less than the vehicle interior temperature; or disabling solar powered battery pack charging and disabling the solar powered vent fan if the ambient air temperature is greater than the vehicle interior temperature.

As part of another aspect of this embodiment, the method also includes: disabling the solar powered vent fan if the current battery pack temperature is less than the threshold battery pack temperature and the ambient air temperature is less than the vehicle interior temperature; and setting the vehicle heating, ventilation and air conditioning (HVAC) system to allow ambient air into the vehicle interior and enabling the solar powered vent fan if the current battery pack temperature is less than the threshold battery pack temperature and the ambient air temperature is greater than the vehicle interior temperature.

In accordance with another aspect, the method further includes: determining if the current battery pack state of charge is greater than a predetermined target state of charge; and, if not, enabling solar powered battery pack charging. Otherwise, if the current battery pack state of charge is greater than the predetermined target state of charge, the method preferably also includes: disabling solar powered battery pack charging; determining if the cell-to-cell voltage of the battery pack is greater than a predetermined maximum allowable voltage difference; and, if the cell-to-cell voltage of the battery pack is greater than the predetermined maximum allowable voltage difference, enabling solar powered battery pack cell equalization. If the cell-to-cell voltage of the battery pack is less than the predetermined maximum allowable voltage difference, the method will then disable solar powered battery pack cell equalization.

As part of another aspect of this embodiment, the method also includes determining if the current vehicle power mode is in "run" mode if the vehicle is not in either off or accessories on mode; and charging the battery pack and the vehicle starting-lighting-and-ignition (SLI) battery based, at least in part, upon a predetermined baseline energy management strategy supplemented with available solar power from the ventilation system solar panel.

According to yet another aspect, the method also includes monitoring the temperature, state of charge, and state of health of the vehicle batteries (e.g., the battery pack, the SLI battery, etc.) if the predetermined minimum solar load is available.

In yet another aspect of this embodiment, the method also includes: charging the SLI battery based, at least in part, upon a predetermined baseline energy management strategy with available solar power if the current vehicle power mode is in off or accessories on mode.

According to another embodiment of the present invention, a method of controlling a solar powered ventilation system for regulating the interior temperature of a motorized vehicle is provided. The vehicle includes an SLI battery, an HVAC system, and a battery pack that is in electrical communication with at least one motor assembly, which is selectively operable to propel the vehicle. The solar powered ventilation system includes a solar panel in electrical communication with the battery pack, the SLI battery, and a fan, and operable to supply electrical power thereto.

The method includes: determining if a predetermined minimum solar load is available; if so, determining if the current vehicle power mode is in "off", "run", or "accessories on" mode; if the vehicle power mode is in off or accessories on mode, the method responds by determining if the current temperature of the battery pack is greater than a predetermined threshold battery pack temperature and if the outside ambient air temperature is less than the vehicle interior temperature; if the current battery pack temperature is greater than the threshold battery pack temperature and the outside ambient air temperature is less than the vehicle interior temperature, the method responds by disabling solar powered battery pack charging, setting the vehicle HVAC system to allow ambient air into the vehicle interior, and enabling the solar powered fan; if, however, the current battery pack temperature is greater than the threshold battery pack temperature and the outside ambient air temperature is greater than the vehicle interior temperature, the method responds by disabling solar powered battery pack charging and disabling the solar powered fan.

In accordance with another embodiment of the present invention, an electrically-propelled motorized vehicle is provided. The vehicle includes one or more electric motor assemblies mounted to the vehicle body and selectively operable to propel the vehicle. A battery pack with one or more battery modules is mounted inside the vehicle interior compartment. Each battery pack battery module is in electrical communication with the electric motor assemblies, and operable to distribute electric current thereto whereby the electric motors propel the vehicle.

The vehicle also includes a ventilation system with an air vent that selectively fluidly communicates (e.g., allows ambient air into) the interior compartment of the vehicle with outside ambient air. The vent system also includes at least one fan that is mounted to the vehicle body, and is operable to pull outside ambient air into the vehicle interior compartment. A solar panel is integrated with a portion of the vehicle body. The solar panel is operatively connected to the battery pack and ventilation system to supply electric power thereto. The solar panel includes at least one solar cell that is configured to convert absorbed sunlight into electricity.

A controller is in operative communication with the ventilation system and the solar panel, and configured to regulate operation of the same. The controller is programmed and configured to determine if sufficient solar load is available, and responsively determine if the current vehicle power mode is in one of off, run, and accessories on mode if sufficient solar load is available. If the current vehicle power mode is in off or accessories on mode, the controller is programmed and configured to determine if the current battery pack temperature is greater than a threshold battery pack temperature and if the outside ambient air temperature is greater than the vehicle interior temperature. The controller is operable to disable solar powered battery pack charging, set the air vent to allow ambient air into the vehicle interior, and command the solar panel to power the fan if the current battery pack temperature is greater than the threshold battery pack temperature and the outside ambient air temperature is less than the vehicle interior temperature.

According to one aspect of this particular embodiment, the controller is also programmed and configured to disable solar powered battery pack charging and command the solar panel to not power the fan if the current battery pack temperature is greater than the threshold battery pack temperature and the outside ambient air temperature is greater than the vehicle interior temperature.

In yet another aspect, the controller is also operable to command the solar panel to not power the fan if the current battery pack temperature is less than the threshold battery pack temperature and the outside ambient air temperature is less than the vehicle interior temperature. To this regard, if the current battery pack temperature is less than the threshold battery pack temperature and the outside ambient air temperature is greater than the vehicle interior temperature, the controller sets the air vent to allow ambient air into the vehicle interior and commands the solar panel to power the fan.

In accordance with another aspect of this embodiment, the controller is also programmed and configured to determine if the current battery pack state of charge is greater than a predetermined target state of charge. If not, the controller enables solar powered battery pack charging.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

Figure 1:
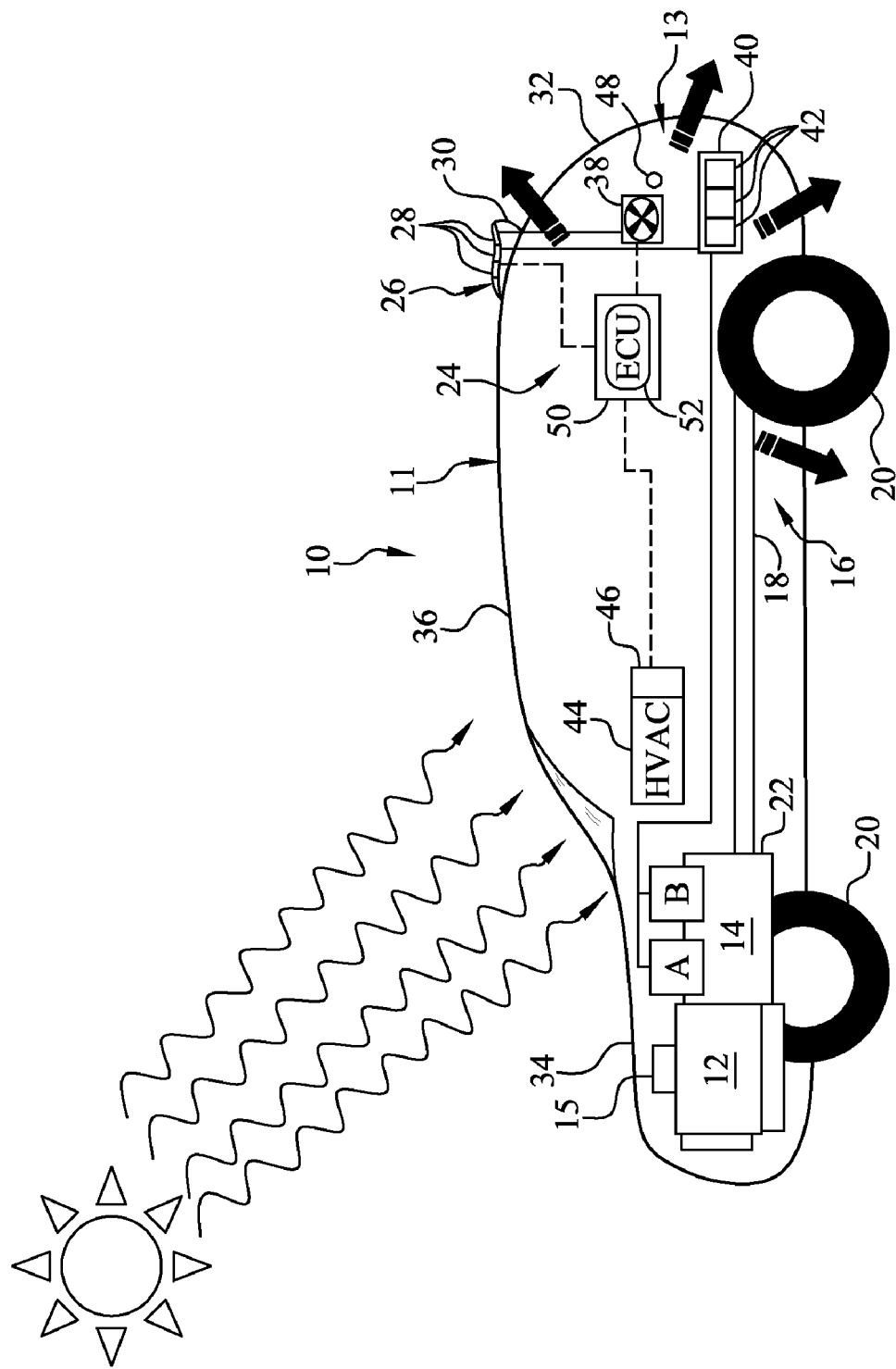
FIG. 1 is a schematic illustration of an exemplary motorized vehicle with a solar powered ventilation system in accordance with a preferred embodiment of the present invention.

Referring to the drawings, wherein like reference numbers refer to like components throughout the several views, FIG. 1 is a side-view, schematic illustration of a representative motorized vehicle, identified generally as 10, with which the present invention may be utilized. The present invention is described herein in the context of a hybrid-type vehicle, offering a representative application by which the present invention may be incorporated and practiced. Accordingly, the present invention is in no way limited to the particular configuration illustrated in FIG. 1. By way of example, the present invention is applicable to electric-hybrid vehicles (both series and parallel), full electric vehicles (EV), electric range extended vehicles (EREV), and any other motorized vehicle configuration utilizing a battery pack to supply power for propulsion of the vehicle. Finally, the hybrid vehicle shown in FIG. 1 has been greatly simplified, it being understood that further information regarding the standard operation of a hybrid powertrain or a hybrid-type vehicle may be found in the prior art.

Turning first to FIG. 1, there is shown a hybrid vehicle 10 having a restartable engine 12 drivingly connected to, or in power flow communication with, a final drive system 16 via a hybrid-type power transmission 14. The engine 12 transfers power, preferably by way of torque, to the transmission 14 through an engine output shaft or crankshaft (not shown). The transmission 14, in turn, is adapted to manipulate and distribute power from the engine 12 to the final drive system 16, which is represented herein by a drive shaft 18 and wheels 20. That is, the drive shaft 18 is configured to distribute torque from the transmission output shaft (not shown) to drive the plurality of wheels 20 and propel the hybrid vehicle 10. In the embodiment depicted in FIG. 1, the engine 14 may be any engine, such as, but not limited to, a compression-ignited diesel engine or a spark-ignited gasoline engine, which is readily adapted to provide its available power output typically at a number of revolutions per minute (RPM). Although not specifically illustrated in FIG. 1, it should be appreciated that the final drive system 16 may comprise any known configuration—e.g., front wheel drive (FWD), rear wheel drive (RWD), four-wheel drive (4WD), or all-wheel drive (AWD), within the scope of the present invention.

A starting-lighting-and-ignition (SLI) battery 15 (also referred to in the art as a "starting, lighting, and accessories" battery) is mounted inside of the vehicle's engine compartment. The SLI battery 10 is rechargeable, electrochemical power source. In its exemplary embodiment, the SLI battery 15 is a standard "12-volt", direct-current (DC) lead-acid battery which provides electricity to power vehicle accessories, head lamps, the starter motor, and for firing the engine's spark plugs (none of which are explicitly illustrated herein).

FIG. 1 also displays selected components of the transmission 12, including a main housing 22 configured to encase first and second electric motor/generator assemblies A and B, respectively. The first and second motor/generators A, B are arranged concentric with and selectively connectable to a main shaft (not shown) of the transmission 14 preferably through a series of epicyclic, planetary gear sets (not shown). The motor/generators A, B operate with one or more selectively engageable torque transmitting mechanisms (e.g., clutches, brakes, etc.) to rotate the transmission output shaft. That is, the motor/generator assemblies A, B are capable of converting electrical energy to mechanical energy (e.g., during vehicle propulsion), and converting mechanical energy to electrical energy (e.g., during regenerative braking).

The motor/generators A, B operate individually, collectively or in concert with the engine 12 (e.g., as first, second and third prime movers) to propel the vehicle 10. For example, a battery pack 40 is mounted inside of a vehicle interior compartment, such as trunk compartment 13. The battery pack 40, which is also referred to as a "tractive battery pack", is made up of an array of battery modules 42 arranged, either in parallel or series, inside of a battery pack case, which in turn is mounted to the vehicle body 11 inside of the interior compartment 13. Each battery pack battery module 42 is in electrical communication (e.g., hard-wired via electric cabling) with the motor/generator assemblies A, B. The pack battery modules 42 distribute electric current to the motor/generator assemblies A, B, which then convert the electricity into rotational power to thereby propel the vehicle 10.

In accordance with the present invention, the vehicle 10 includes a solar powered ventilation system, generally indicated at 24. A solar panel 26 (more appropriately identified as a "solar photovoltaic module") is integrated into the vehicle body 11. In the embodiment of FIG. 1, the solar panel 26 is integrated into an aerodynamic spoiler 30 on a rearward portion of the vehicle body 11. However, the solar panel 26 may also be mounted on or formed into the vehicle's 10 deck lid or lift gate 32, engine hood 34, roof structure 36, instrument panel (not shown), etc. The solar panel 26 is a packaged, interconnected assembly of photovoltaic cells 28 (also known as "solar cells") which are operable for absorbing sunlight and converting radiation of the absorbed sunlight into electricity. The general operation of photovoltaic cells is well known in the prior art, and will therefore not be discussed in extensive detail herein.

The solar cell output is used, in part, to recharge the SLI battery 15 and battery pack 40. The solar cell output is also used to power one or more small ventilation fans 38 in the vehicle 10. The fan 38 is integrated to the vehicle body 11, and operates to pull ambient air into the vehicle interior compartment 13, or to recirculate the air inside of the vehicle interior compartment 13, as will be described hereinbelow in the discussion of FIGS. 2A and 2B. Notably, the solar panel 26 and vent fan 38 can be stand-alone, or may be powered on and off via vehicle power moding if it becomes desirable to turn the vent fan 38 off when the vehicle 10 is running, or during winter months when outside ambient temperatures are cold and solar heating of the various vehicle interior compartments may be desirable.

The vehicle also includes a heating, ventilation and air conditioning (HVAC) system 44 of conventional architecture. Of primary relevance to the invention presented herein, the HVAC system 44 includes an air vent 46 that selectively fluidly communicates the interior compartment 13 of the vehicle 10 with outside ambient air. The HVAC system 44 also includes a pressure relief valve (PRV) 48 which essentially acts as a "return" for air sucked into the various vehicle interior compartments via the HVAC system 44 and fan 38.

The solar powered ventilation system 24 also includes a system controller, depicted in FIG. 1, in an exemplary embodiment, as a micro-processor based electronic control unit (ECU) 50. The ECU 50 has a suitable amount of programmable memory 52 that is programmed to include, among other things, an algorithm or method 100 of controlling a solar powered ventilation system, as will be discussed in further detail below with respect to FIGS. 2A and 2B. The ECU 50 is configured or programmed, in part, to control operation of the fan 38, and manage the distribution of power (i.e., current and voltage) from the solar panel 26 to the various components of the vehicle 10. Although shown as a separate, independent controller device, the ECU 50 may be part of the vehicle's onboard electronic control module (not shown) without departing from the intended scope of the present invention. In addition, the ECU 50 can be configured to "stay awake" continuously in order to regulate the ventilation system 24 in real time. Alternatively, the ECU 50 can be intermittently "awakened" (e.g., once every 24 hours) The energy required to run the ECU 50 may come from the SLI battery 15 and then replenished by the solar panel 26, or may have its own rechargeable battery.

Figure 2A:
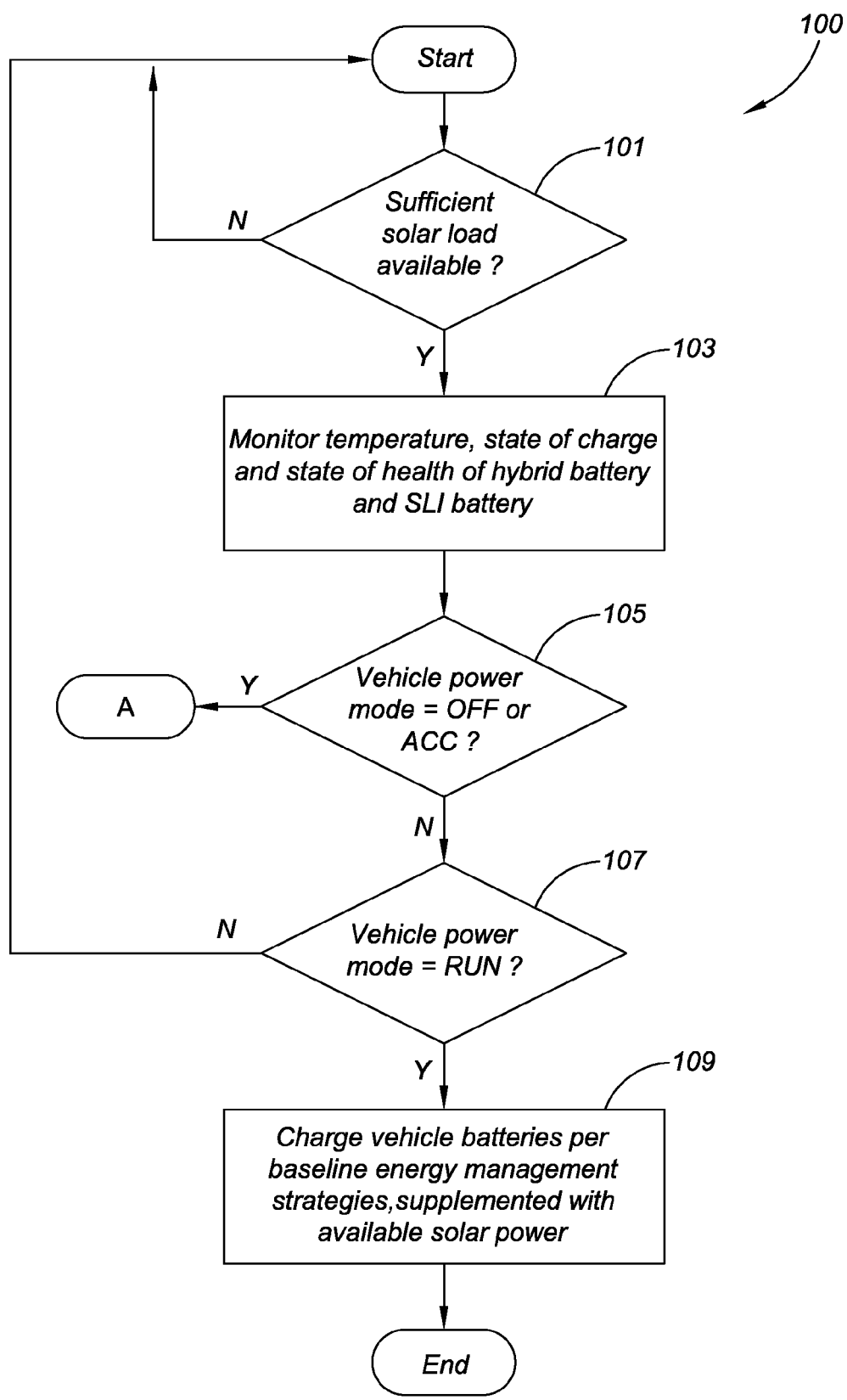
FIGS. 2A and 2B, in combination, provide a flow chart illustrating an algorithm or method of controlling a solar powered ventilation system in accordance with a preferred embodiment of the present invention.
Figure 2B:
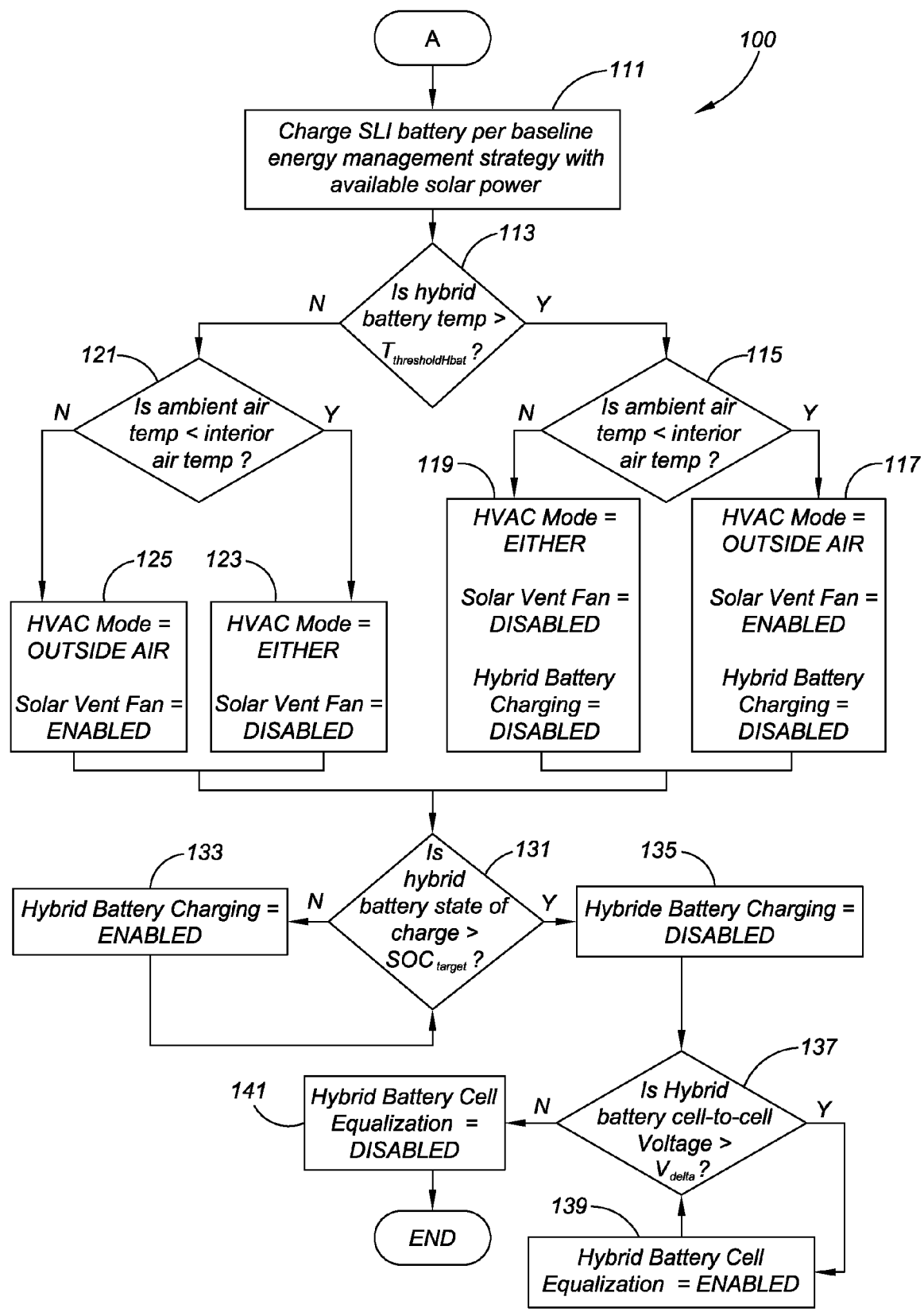

With reference now to the flow charts shown in FIGS. 2A and 2B, an algorithm for controlling operation of a vehicle ventilation system, namely an improved method of operating a solar powered ventilation system to improve overall battery pack performance and increase battery pack operational life expectancy, is shown generally as 100 in accordance with a preferred embodiment of the present invention. The method or algorithm 100 is described herein with respect to the structure illustrated in FIG. 1. However, the present invention may also be incorporated into other vehicle configurations, and applied to other powertrain arrangements. In addition, the method 100 preferably includes at least steps 101-139. However, it is within the scope and spirit of the present invention to omit steps, include additional steps, and/or modify the order presented in FIGS. 2A and 2B. It should be further noted that the method 100 represents a single operation. However, it is contemplated that the method 100 be applied in a systematic and repetitive manner.

Looking to FIG. 2A, the method 100 begins at step 101 with determining if there is sufficient solar load available. A "sufficient" solar load is available if the solar cells 28 put out essentially a fixed voltage with power available dependent upon how much solar load is available above a predetermined threshold amount. By way of example, a "sufficient" solar energy may be a minimum amount of sunlight that will automatically power on the solar powered ventilation system controller 50, which in turn would provide control over the system functions, depending upon how much additional solar energy can be made available. If sufficient solar energy is not available, the method 100 will discontinue, and return to start. If a predetermined minimum solar load is available, the method 100 will then monitor, in a preferably continuous manner, the temperature, state of charge, and state of health of the vehicle batteries (e.g., SLI battery 15 and battery pack 40), as step 103. The state of health, for example, is a measure of a battery's ability to provide functionality over its design life.

Prior to step 103, contemporaneously therewith, or thereafter, the method 100 then determines the current vehicle power mode. That is, in step 105, the system controller 50 will detect if the vehicle 10 is in an off-state—i.e., the engine 12 and motor/generators A, B are powered "OFF", or in an "accessories on" mode ("ACC")—i.e., when the vehicle powertrain is off, but the vehicle accessories (e.g., radio, windshield wipers, etc.) are still operable. If the vehicle 10 is not in "OFF" or "ACC" mode, the method 100 will then detect in step 107 if the vehicle is in an on-state ("RUN")—i.e., at least one of the engine 12 and the first and second electric motor/generator assemblies A, B are powered on. If so, the vehicle batteries, such as the SLI battery 15 and battery pack 40, will be charged per baseline energy management strategies (e.g., logic used to maintain the battery pack in a state that enables it to provide proper vehicle functionality over its design life), supplemented with the available solar power, in step 109.

Turning now to FIG. 2B, if the vehicle power mode is currently in "OFF" or "ACC" mode, the method will respond in step 113 by determining if the current battery pack temperature is greater than a threshold battery pack temperature ($T_{Hbat} > T_{thresholdHbat}$). The threshold battery pack temperature ($T_{thresholdHbat}$) refers to a calibrateable battery pack temperature threshold that could be, for example, a table or range of values, which may depend on other factors (e.g., outside ambient temp). This value would be specific to the particular vehicle application and battery technology. Prior to, contemporaneous with, or subsequent to step 113, the ECU 50 will command the solar panel 26 to charge the SLI battery with available solar power based, at least in part, upon a predetermined baseline energy management strategy if the current vehicle power mode is in "OFF" or "ACC" mode (i.e., Step 105=Yes) in step 111.

In order to protect the battery pack 40 from excessive heat, the ECU 50 will command the solar powered ventilation system 24 to modify the interior temperature of the vehicle 10 to thereby decrease the temperature of the batter pack 40 if the current battery pack temperature ($T_{Hbat}$) is greater than the threshold battery pack temperature ($T_{thresholdHbat}$). According to the preferred embodiment of FIG. 2B, the method 100 will first determine, in step 115, if the outside ambient air temperature is less than the vehicle interior temperature. In this instance, if the ambient air temperature is cooler than the vehicle interior temperature (i.e., Step 115=Yes), and the battery pack temperature is hotter than the threshold battery pack temperature (i.e., Step 113=Yes), the ventilation system 24 operates to cool the interior compartment 13. As such, step 117 includes disabling solar powered battery pack charging (i.e., commanding the solar panel 26 to cease from distributing electricity to the battery pack 40), setting the vehicle HVAC system 44, namely air vent 46, to allow ambient air into the vehicle interior ("HVAC Mode=OUTSIDE AIR"), and commanding the solar panel 26 to distribute electricity to power the vent fan 38 ("Solar Vent Fan=ENABLED"). That is, when the vehicle is keyed off, the ECU 50 may remain awake long enough to command the HVAC system 44 to the desired air mode before shutdown. With the vehicle keyed off and outside air allowed to enter the interior compartment, the solar powered fan 38 will pull fresh air through the occupant compartment, through the battery pack 40 and possibly other hybrid power electronics (e.g., an inverter to convert AC current from the electric motor to DC current at the battery terminals, and a DC converter to convert from the DC voltage of the hybrid battery to AC voltage), and back outside the vehicle through the PRV 48. This will remove the solar load driven hot air and maintain vehicle interior temperatures close to outside ambient temperatures.

If, however, the battery pack is warm (i.e., $T_{Hbat} > T_{thresholdHbat}$), but it is colder inside of the vehicle 10 than it is outside, the solar powered ventilation system 24 wants to keep the entrained air that is already inside the interior compartment 13. For example, in step 119, the system controller 50 disables solar powered battery pack charging, and disables the solar powered vent fan if the ambient air temperature is greater than the vehicle interior temperature and the battery pack temperature is greater than the threshold battery pack temperature. In step 119, the HVAC air vent 46 may be closed to prevent outside air from being pulled into the interior compartment 13, or may be opened (as in step 117).

With continued reference to FIG. 2B, the method also includes steps 121-125. In step 121, the controller 50 determines if the outside ambient air temperature is less than the vehicle interior temperature. If the current battery pack temperature is less than the threshold battery pack temperature, and the ambient air temperature is less than the vehicle interior temperature the system controller 50 will respond in step 123 by disabling the solar powered vent fan 38. If, however, the current battery pack temperature is cooler than the threshold battery pack temperature (i.e., Step 113=No), and the ambient air temperature is greater than the vehicle interior temperature (i.e., Step 121=No), the method 100 responds by setting the vehicle HVAC system to allow ambient air into the vehicle interior and enabling the solar powered vent fan, as step 125. It may also be desirable to use two different threshold temperatures in deciding how to optimize battery pack performance. For example, an upper temperature threshold may be used to decide if the battery pack is too hot and, thus, should be cooled, as well as a different, much lower temperature threshold to decide if the battery pack 40 is too cold and, thus, should be heated using the solar powered ventilation system 24.

Once the interior environment of the vehicle 10 is adjusted by the solar powered ventilation system 24 to ensure optimal overall battery pack performance and increased operational life expectancy, the ventilation system 24 is then employed to regulate the battery pack state of charge (SOC) and cell-to-cell voltage while the vehicle 10 is keyed "OFF". In the embodiment of FIG. 2B, step 131 includes determining if the current battery pack state of charge is greater than a predetermined target state of charge ($SOC_{target}$). If not, the method 100 responds in step 133 by enabling solar powered battery pack charging. For example, a particular vehicle architecture may require the battery pack 40 be at 60% SOC +/−10%. Say, in one instance, the particular vehicle battery SOC is at 65% when the vehicle 10 is powered off, if sufficient solar energy were available, the ECU 50 will command the solar panel 26 to charge the battery pack 40 up to 70%, then use the remaining energy for other functions. The target state of charge $SOC_{target}$ will depend on the battery technology and type of vehicle as mentioned above.

If the current battery pack state of charge is greater than the predetermined target state of charge (i.e., Step 131=Yes), the system controller 50 will then disable solar powered battery pack charging, in step 135, and then determine if the cell-to-cell voltage (or "cell-to cell voltage difference") of the battery pack is greater than a predetermined maximum allowable voltage difference ($V_{delta}$), in step 137. $V_{delta}$ is a calibrateable value (e.g., table of values) specific to a particular vehicle architecture/battery technology. $V_{delta}$ reflects a maximum allowable difference in voltage between the individual battery modules 42. As the difference in operating cell voltage increases, the usefulness of the overall battery pack 40 may decrease because the higher voltage cells can get overcharged, whereas the lower voltage cells can get undercharged. In step 139, the method 100 enables solar powered battery pack cell equalization ("Hybrid Battery Cell Equalization=ENABLED) if the cell-to-cell voltage of the battery pack is greater than the predetermined maximum allowable voltage difference (i.e., Step 137=Yes). "Equalization" is a mode of operation which adjusts voltage distribution to get the battery modules 42 to be at the same voltage. For example, the ECU 50 can command the solar panel 26 to charge the low voltage cells up to the average, discharge the high voltage cells down to the average, or "shuttle" the energy within the battery pack 40—i.e., charge the low voltage cells using energy from discharging the high voltage cells. If the cell-to-cell voltage of the battery pack 40 is less than the predetermined maximum allowable voltage difference $V_{delta}$, the method 100 then includes disabling solar powered battery pack cell equalization, as step 141.

The present invention would generally allow more consistent vehicle performance without negatively affecting battery life by helping to limit maximum battery temperatures. This invention would also improve comfort levels for the occupants upon entering the vehicle, resulting in lower initial cool-down A/C power and improved real-world fuel economy. In addition, certain heat-sensitive items could possibly be left in the parked vehicle that otherwise would succumb to the excessive solar load. Finally, because this invention is solar powered, the energy required to operate is free and will not increase the vehicle 12V accessory load.

While the best modes for carrying out the invention have been described in detail, those familiar with the art to which this invention pertains will recognize various alternative designs and embodiments for practicing the invention within the scope of the appended claims.

The invention claimed is:

1. A method of controlling a solar powered ventilation system for a motorized vehicle having a battery pack in electrical communication with at least one motor assembly selectively operable to propel the vehicle, the method comprising:
   determining if a predetermined minimum solar load is available;
   determining if a current power mode of the vehicle is in one of off and accessories on mode if said predetermined minimum solar load is available;
   determining if a current temperature of the battery pack is greater than a threshold battery pack temperature if said current vehicle power mode is in off or accessories on mode; and
   commanding the solar powered ventilation system to modify an interior temperature of the vehicle to thereby decrease the temperature of said battery pack if said current battery pack temperature is greater than said threshold battery pack temperature.

2. The method of claim 1, further comprising:
   determining if an ambient air temperature is less than said vehicle interior temperature if said current vehicle power mode is in off or accessories on mode.

3. The method of claim 2, wherein commanding the solar powered ventilation system to modify said vehicle interior temperature to thereby decrease the temperature of said battery pack includes:
   disabling solar powered battery pack charging, setting a vehicle HVAC system to allow ambient air into the vehicle interior, and enabling a solar powered vent fan of the solar powered ventilation system if the ambient air temperature is less than said vehicle interior temperature; and
   disabling solar powered battery pack charging and disabling said solar powered vent fan if the ambient air temperature is greater than said vehicle interior temperature.

4. The method of claim 3, further comprising:
   disabling said solar powered vent fan if said current battery pack temperature is less than said threshold battery pack temperature and the ambient air temperature is less than said vehicle interior temperature; and
   setting said vehicle HVAC system to allow ambient air into vehicle interior and enabling said solar powered vent fan if said current battery pack temperature is less than said threshold battery pack temperature and the ambient air temperature is greater than said vehicle interior temperature.

5. The method of claim 4, further comprising:
   determining if a current battery pack state of charge is greater than a predetermined target state of charge; and
   enabling solar powered battery pack charging if said current battery pack state of charge is less than said predetermined target state of charge.

6. The method of claim 5, further comprising:
   disabling solar powered battery pack charging if said current battery pack state of charge is greater than said predetermined target state of charge;
   determining if a cell-to-cell voltage of the battery pack is greater than a predetermined maximum allowable voltage difference; and
   enabling solar powered battery pack cell equalization if said cell-to-cell voltage of the battery pack is greater than said predetermined maximum allowable voltage difference.

7. The method of claim 6, further comprising:
   disabling solar powered battery pack cell equalization if said cell-to-cell voltage of the battery pack is less than said predetermined maximum allowable voltage difference.

8. The method of claim 1, further comprising:
   determining if said current vehicle power mode is in run mode if said current vehicle power mode is not in off or accessories on mode; and charging the battery pack and a vehicle starting-lighting-and-ignition battery based at least in part upon a predetermined baseline energy management strategy supplemented with available solar power.

9. The method of claim 1, further comprising:
monitoring a temperature, state of charge, and state of health of the battery pack and a vehicle starting-lighting-and-ignition battery if said predetermined minimum solar load is available.

10. The method of claim 1, further comprising:
charging a vehicle starting-lighting-and-ignition battery based at least in part upon a predetermined baseline energy management strategy with available solar power if said current vehicle power mode is in off or accessories on mode.

11. A method of controlling a solar powered ventilation system for regulating an interior temperature of a motorized vehicle, the vehicle including an SLI battery, an HVAC system, and a battery pack in electrical communication with at least one motor assembly selectively operable to propel the vehicle, the solar powered ventilation system including a solar panel in electrical communication with a fan, the battery pack, and the SLI battery, and operable to supply electrical power thereto, the method comprising:
determining if a predetermined minimum solar load is available;
determining if a current vehicle power mode is in one of off, run, and accessories on mode if said predetermined minimum solar load is available;
determining if an outside ambient air temperature is less than the vehicle interior temperature and if a current temperature of the battery pack is greater than a threshold battery pack temperature if said current vehicle power mode is in off or accessories on mode;
disabling solar powered battery pack charging, setting the vehicle HVAC system to allow ambient air into the vehicle interior, and enabling the solar powered fan if said current battery pack temperature is greater than said threshold battery pack temperature and the outside ambient air temperature is less than said vehicle interior temperature; and
disabling solar powered battery pack charging and disabling said solar powered fan if said current battery pack temperature is greater than said threshold battery pack temperature and the outside ambient air temperature is greater than said vehicle interior temperature.

12. The method of claim 11, further comprising:
disabling said solar powered fan if said current battery pack temperature is less than said threshold battery pack temperature and the outside ambient air temperature is less than said vehicle interior temperature; and
setting the vehicle HVAC system to allow ambient air into vehicle interior and enabling said solar powered fan if said current battery pack temperature is less than said threshold battery pack temperature and the outside ambient air temperature is greater than said vehicle interior temperature.

13. The method of claim 12, further comprising:
determining if a current battery pack state of charge is greater than a predetermined target state of charge; and
enabling solar powered battery pack charging if said current battery pack state of charge is less than said predetermined target state of charge.

14. The method of claim 13, further comprising:
disabling solar powered battery pack charging if said current battery pack state of charge is greater than said predetermined target state of charge;

determining if a cell-to-cell voltage of the battery pack is greater than a predetermined maximum allowable voltage difference;
enabling solar powered battery pack cell equalization if said cell-to-cell voltage of the battery pack is greater than said predetermined maximum allowable voltage difference; and
disabling solar powered battery pack cell equalization if said cell-to-cell voltage of the battery pack is less than said predetermined maximum allowable voltage difference.

15. An electrically-propelled motorized vehicle having a vehicle body defining an interior compartment therein, the vehicle comprising:
at least one electric motor assembly mounted to the vehicle body and selectively operable to propel the vehicle;
a battery pack including at least one battery module mounted inside the vehicle interior compartment and in electrical communication with said at least one electric motor assembly to distribute electric current thereto whereby said at least one electric motor assembly propels the vehicle;
a ventilation system including an air vent selectively fluidly communicating the interior compartment with outside ambient air, and at least one fan mounted to the vehicle body and operable to pull ambient air into the vehicle interior compartment;
a solar panel integrated with the vehicle body and operatively connected to said battery pack and ventilation system to supply electric power thereto, said solar panel including at least one solar cell configured to convert absorbed sunlight into electricity; and
a controller in operative communication with said ventilation system and said solar panel and configured to regulate operation of the same;
wherein said controller is programmed and configured to determine if a predetermined minimum solar load is available and responsively determine if a current vehicle power mode is in one of off, run, and accessories on mode if said predetermined minimum solar load is available;
wherein said controller is programmed and configured to determine if a current temperature of said battery pack is greater than a threshold battery pack temperature and if an outside ambient air temperature is greater than a vehicle interior temperature if said current vehicle power mode is in off or accessories on mode;
wherein said controller is programmed and configured to disable solar powered battery pack charging, set said air vent to allow ambient air into the vehicle interior, and command said solar panel to power said fan if said current battery pack temperature is greater than said threshold battery pack temperature and the outside ambient air temperature is less than said vehicle interior temperature.

16. The vehicle of claim 15, wherein said controller is further programmed and configured to disable solar powered battery pack charging and command said solar panel to not power said fan if said current battery pack temperature is greater than said threshold battery pack temperature and the outside ambient air temperature is greater than said vehicle interior temperature.

17. The vehicle of claim 16, wherein said controller is further programmed and configured to command said solar panel to not power said fan if said current battery pack temperature is less than said threshold battery pack temperature and the outside ambient air temperature is less than said vehicle interior temperature; and set said air vent to allow ambient air into the vehicle interior and command said solar panel to power said fan if said current battery pack temperature is less than said threshold battery pack temperature and the outside ambient air temperature is greater than said vehicle interior temperature.

18. The vehicle of claim 17, wherein said controller is further programmed and configured to determine if a current battery pack state of charge is greater than a predetermined target state of charge; and enable solar powered battery pack charging if said current battery pack state of charge is less than said predetermined target state of charge.

* * * * *